April 21, 1925.
W. B. ZASS
1,534,674
FISHING ROD HANDLE
Filed Nov. 15, 1924
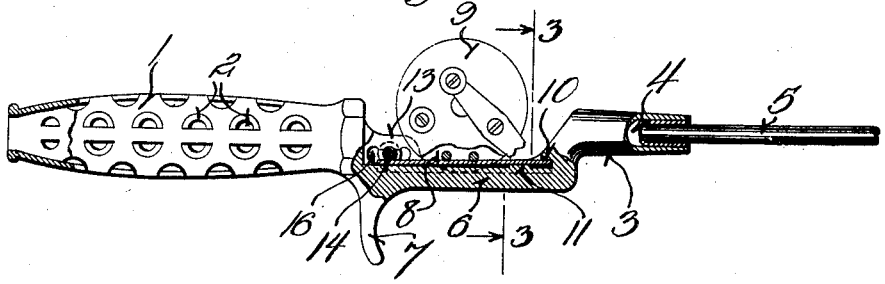
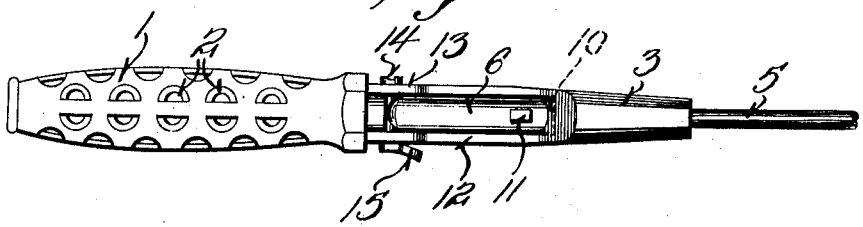
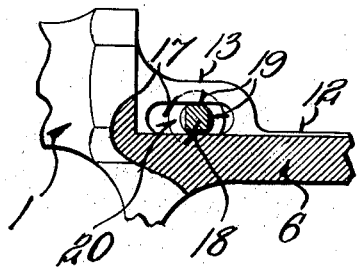
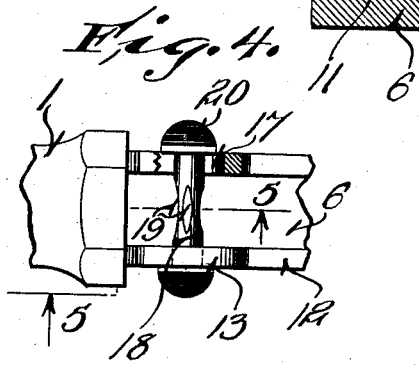
Inventor!
William B. Zass
Witness!
Erwin B. Eiring
Attorneys!

Patented Apr. 21, 1925.                                                    1,534,674

UNITED STATES PATENT OFFICE.

WILLIAM B. ZASS, OF MILWAUKEE, WISCONSIN.

FISHING-ROD HANDLE.

Application filed November 15, 1924. Serial No. 750,096.

*To all whom it may concern:*

Be it known that I, WILLIAM B. ZASS, a citizen of the United States, and resident of Milwaukee, in the county of Milwaukee and State of Wisconsin, have invented certain new and useful Improvements in Fishing-Rod Handles; and I do hereby declare that the following is a full, clear and exact description thereof.

This invention relates to fishing rod handles.

Objects of this invention are to provide a fishing rod handle which will receive any of the usual types of fishing rods, which is adapted to receive a conventional type of reel, which will securely lock the reel in position and rigidly hold it with reference to the handle, and which is provided with a sunken portion in which the reel seats.

Further objects are to provide a fishing rod handle which is extremely light and of rigid construction, which may be most readily gripped, and which may be provided with a finger hold or grip integral with the handle, and which is so constructed that variation in the size of the reel base may be most readily accommodated.

Embodiments of this invention are shown in the accompanying drawings in which:—

Figure 1 is a side view of one form of handle, such view being partly in section and showing the reel.

Figure 2 is a top view of the structure shown in Figure 1 with the reel removed.

Figure 3 is an enlarged transverse sectional view on the line 3—3 of Figure 1.

Figure 4 is a fragmentary view of a modified form of reel lock corresponding to a portion of that shown in Figure 2.

Figure 5 is a sectional view on the line 5—5 of Figure 4.

The reel handle is formed of metal and in the preferred form is constructed of aluminum which is light and which will not corrode although it is to be understood that any suitable metal adapted for this particular purpose may be employed. The handle is provided with a hand grip 1 which is hollow and has generally a cross sectional contour of an elongated oval. It is provided with a plurality of apertures 2 which have outwardly slanting faces, as illustrated in Figures 1 and 2. These slanting faces permit the fleshy portion of the hand to sink into the handle and thus a firm and adequate grip is easily secured. The forward portion of the handle is provided with a sleeve 3 which is preferably lined with a reenforcing bushing 4 such for instance as brass. This sleeve receives the fishing rod 5.

An intermediate depressed portion 6 is provided and is integrally formed with the hand grip 1 and the sleeve 3, as clearly shown in Figure 1. Further, a finger grip 7 extends downwardly adjacent the forward end of the hand grip 1. This depressed portion 6 is adapted to receive the base 8 of the reel 9, and to thus position the reel in a conveniently accessible position so that it may be most easily handled by the operator. This depressed portion is provided with a slot 10 adjacent its forward end which is preferably formed by means of a portion overhanging the intermediate portion 6, as clearly shown in Figures 1 and 2. This slot receives the forward end of the reel base 8. It is to be noted from Figures 1, 2 and 3 that the intermediate portion is provided with an upstanding relatively small lug 11 which is located centrally thereof and in close proximity to the slot 10. This lug is adapted to contact with the lower side of the reel base and to cause such base to flex. A pair of relatively short flanges 12 are positioned on opposite sides of the intermediate portions and merge into upstanding slotted flanges 13 adjacent the rear end thereof, such flanges merging into the hand grip 1. A fastener 14 is slidably positioned within these slots and is preferably formed with an eccentric central portion. This fastener is adapted to be slid over the rear end of the reel base 8, as shown in Figure 1 and by means of the handle 15 rigidly carried by such fastener, it may be rocked to cause the fastener to bind the rear end of the reel base downwardly against the upper side of the intermediate portion, such reel base being positioned between the side flanges, as clearly shown in Figure 3.

It is to be noted that the upper edges of the slots 16 in the flanges 13 are provided with recessed portions into any one of which the fastener 14 is adapted to be positioned when adjusting it over the rear end of the reel base 8. In using this device the rod is slipped into position in the sleeve 3 and the forward end of the reel base is positioned within the slot 10. Thereafter, its rear end is pressed downwardly, the upstanding lug 11 causing such base to flex and to thus tightly bind in the slot and against such lug. Thereafter, the fastener 14 is slid forwardly over the rear end of the reel base and the handle 15 is rocked to cause the eccentric fastener to bind the rear end of the reel base tightly against the intermediate portion.

In the modified construction illustrated in Figures 4 and 5, the same general principles are employed, the side flanges 12 and 13 for the intermediate portion 6 being retained, as clearly shown in such figures. However, the slots 17 corresponding to the slots 16 are preferably straight, as shown in Figure 5, and free from recesses. The fastener in this case comprises a pin 18 which is provided with cut out portions 19 forming a plurality of faces. These cut away portions are of different depths, as illustrated in Figure 4, so as to accommodate various sizes or dimensions of reel bases. Preferably a pair of ribbed or otherwise ornamented and roughened manipulating knobs 20 are carried by the outer ends of the pin 18 and are used to manipulate such pin. In using this last described form of invention, the reel base is positioned, as previously described, and its rear end is held downwardly and the fastener or pin 18 slid forwardly thereover. Obviously, a cut away portion 19 of the requisite size is presented towards the reel base by rotating the pin 18 to the right position prior to sliding it over the rear end of the reel base.

It is to be noted that the portion 6 presents a curved upper surface towards the reel base 8, as most clearly shown in Figure 3, and that in addition to this the reel base is caused to bind by the cooperative action of the slot 10, the lug 11 and the fastener, thus rigidly and securely locking the reel base upon the intermediate portion.

It will be seen from this detailed description that a fishing rod handle has been provided, which is extremely effective and serviceable, which may be made very light, which offers an easy grip and readily retained handle and to which the rod and reel may be very quickly and readily attached in a simple and effective manner.

Although the invention has been described in considerable detail, it is to be understood that the invention may be variously embodied and is, therefore, to be limited only as claimed.

I claim:

1. A fishing rod handle comprising an integral body portion having a hand grip at its rear end and a rod receiving sleeve at its forward end and a depressed reel receiving intermediate portion, said intermediate portion having means for engaging the forward end of a reel base and having a pair of slotted side flanges adjacent its rear end, and a fastener carried in the slots and adapted to be slid forwardly over the rear end of the reel base.

2. A fishing rod handle having a hand grip at its rear end provided with a downwardly extending finger grip and having a rod receiving sleeve at its front end and having a depressed reel receiving portion intermediate the said sleeve and handle and integral with such sleeve and handle, said depressed portion having a slot at its forward end adapted to receive the forward end of a reel base, and having a lug spaced rearwardly of said slot and in close proximity thereto for contact with the under side of the reel base, and a fastener adjacent the rear end of said depressed portion for engaging the rear end of the reel base.

3. A cast metal fishing rod handle comprising a hand grip having a forwardly extending sunken portion adapted to receive a reel having an elongated base strip, said sunken portion having a slot at its forward end for the reception of the forward end of the reel base and having an upwardly projecting lug adapted to contact with said reel base and cause such base to flex, said sunken portion having a pair of slotted side flanges adjacent its rear end, an eccentric lock slidably mounted in said slots and adapted to be slid over the rear of said reel base and to hold such rear end of said reel base downwardly, and a sleeve projecting forwardly from said sunken portion and adapted to receive a rod.

In testimony that I claim the foregoing I have hereunto set my hand at Milwaukee, in the county of Milwaukee and State of Wisconsin.

WILLIAM B. ZASS.